(12) United States Patent
Fujimori

(10) Patent No.: US 12,150,040 B2
(45) Date of Patent: Nov. 19, 2024

(54) COMMUNICATION DEVICE, COMMUNICATION METHOD, AND COMPUTER-READABLE STORAGE MEDIUM

(71) Applicant: CANON KABUSHIKI KAISHA, Tokyo (JP)

(72) Inventor: Yuki Fujimori, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 384 days.

(21) Appl. No.: 17/485,609

(22) Filed: Sep. 27, 2021

(65) Prior Publication Data

US 2022/0015022 A1    Jan. 13, 2022

Related U.S. Application Data

(63) Continuation of application No. PCT/JP2020/011185, filed on Mar. 13, 2020.

(30) Foreign Application Priority Data

Mar. 29, 2019   (JP) .................................. 2019-068072

(51) Int. Cl.
*H04W 4/00*   (2018.01)
*H04L 5/00*   (2006.01)
(Continued)

(52) U.S. Cl.
CPC ........... *H04W 48/16* (2013.01); *H04L 5/0005* (2013.01); *H04L 5/0048* (2013.01); *H04W 48/20* (2013.01);
(Continued)

(58) Field of Classification Search
None
See application file for complete search history.

(56) References Cited

U.S. PATENT DOCUMENTS 10,321,484 B2 *   6/2019   Lou ....................... H04W 72/21
2016/0198350 A1   7/2016   Lou
(Continued)

FOREIGN PATENT DOCUMENTS

CN   104956735 A   9/2015
CN   105981310 A   9/2016
(Continued)

OTHER PUBLICATIONS

Chinese Office Action issued in corresponding CN Patent Application No. 202080025471.1, dated Jul. 25, 2023, with English translation.

(Continued)

*Primary Examiner* — Zewdu A Beyen
(74) *Attorney, Agent, or Firm* — Carter, DeLuca & Farrell LLP

(57) ABSTRACT

A communication device conforming to a standard of a IEEE 802.11 series determines one or more frequency bands that the communication device can use for communication, generates a frame in which information of the determined one or more frequency bands is included, and transmits the generated frame. The frame includes a Multi-band element for notifying the information of the determined one or more frequency bands, and the information indicating the determined one or more frequency bands is included in a Band ID field for identifying the frequency band in the Multi-band element. The determined one or more frequency bands include a 6 GHz band.

13 Claims, 6 Drawing Sheets

(51) Int. Cl.
   *H04W 48/16*  (2009.01)
   *H04W 48/20*  (2009.01)
   *H04W 72/0446*  (2023.01)
   *H04W 72/0453*  (2023.01)
(52) U.S. Cl.
   CPC ... *H04W 72/0446* (2013.01); *H04W 72/0453* (2013.01)

(56) References Cited

U.S. PATENT DOCUMENTS

| | | | | |
|---|---|---|---|---|
| 2017/0223587 | A1* | 8/2017 | Trainin | H04W 12/06 |
| 2019/0082373 | A1 | 3/2019 | Patil et al. | |
| 2020/0037325 | A1* | 1/2020 | Chu | H04W 24/02 |
| 2021/0367714 | A1 | 11/2021 | Fujimori | |
| 2021/0368391 | A1 | 11/2021 | Fujimori | |

FOREIGN PATENT DOCUMENTS

| | | | | |
|---|---|---|---|---|
| JP | 2006-345274 | A | 12/2006 | |
| JP | 2018-050133 | A | 3/2018 | |
| JP | 2022-509614 | A | 1/2022 | |
| WO | 2017/136089 | A1 | 8/2017 | |
| WO | WO-2020085997 | A1 * | 4/2020 | H04L 1/1896 |
| WO | 2020/112020 | A1 | 6/2020 | |

OTHER PUBLICATIONS

Cordeiro, C. et al., "Fixes to multi-band operations" IEEE 802.11-18/14r5, IEEE, Internet <URLL:https://mentor.ieee.org/802.11/dcn/18/11-18-1324-05-000m-fixes-tp-mi;to-band operations.docx> (Sep. 11, 2018) pp. 1-3.
Japanese Office Action issued in corresponding JP Patent Application No. 2019-068072, dated Sep. 30, 2022, with English Translation.
Supplementary European Search Report issued in corresponding EP Patent Application No. 20782068.9, dated Oct. 14, 2022, pp. 1-10.
Cordeiro, C. et al., "Fixes to multi-band operations" IEEE 802.11-18/1324r5 (Jul. 2018) pp. 1-12.
Fang, Y.G. et al., "EHT potential enhancement discussion" IEEE 802.11-2018/1904r0 (Nov. 2018) pp. 1-20.
International Search Report issued by the Japan Patent Office on Jun. 2, 2020 in corresponding International Application No. PCT/JP2020/011185, with English translation.
Fang, Y.G. et al., "EHT potential enhancement discussion" IEEE802.11181904r1, Internet <URL:https:mentor.ieee.org802.11dcn181118190401Oehtehtpotentialenhancementdiscussion.pptx> (Nov. 2018) pp. 1-6.
Kim, S.W. et al., "Comment resolutions on WUR capability element" IEEE802.11181874r1, Internet <URL:https:mentor.ieee.org802.11dcn18111818740100bacommentresolutionsonwurcapabilityelement.docx> (Nov. 2018) pp. 1-3.
Korean Office Action issued in corresponding KR Patent Application No. 10-2021-7029725 dated Jan. 31, 2024, with English translation.
Korean Notice of Allowance issued in corresponding KR Patent Application No. 10-2021-7029725 dated Sep. 27, 2024, with English translation.

* cited by examiner

FIG. 6

Multi-band element format

| Element ID | Length | Multi-band control | Band ID | Operating Class | Channel Number | BSSID | Beacon Interval |
|---|---|---|---|---|---|---|---|
| 601 | 602 | 603 | 604 | 605 | 606 | 607 | 608 |

| TSF Offset | Multi-band Connection Capability | FSTSession Timeout | STA MAC Address | Pairwise Cipher Suite Count | Pairwise Cipher Suite List |
|---|---|---|---|---|---|
| 609 | 610 | 611 | 612 | 613 | 614 |

FIG. 7

Band ID FIELD

| Band ID value | Meaning |
|---|---|
| 0 | TV white spaces |
| 1 | Sub-1 GHz (exluding TV white spaces) |
| 2 | 2.4GHz |
| 3 | 3.6GHz |
| 4 | 4.9 and 5 GHz |
| 5 | 60GHz |
| 6 | 6GHz |
| 7-255 | Reserved |

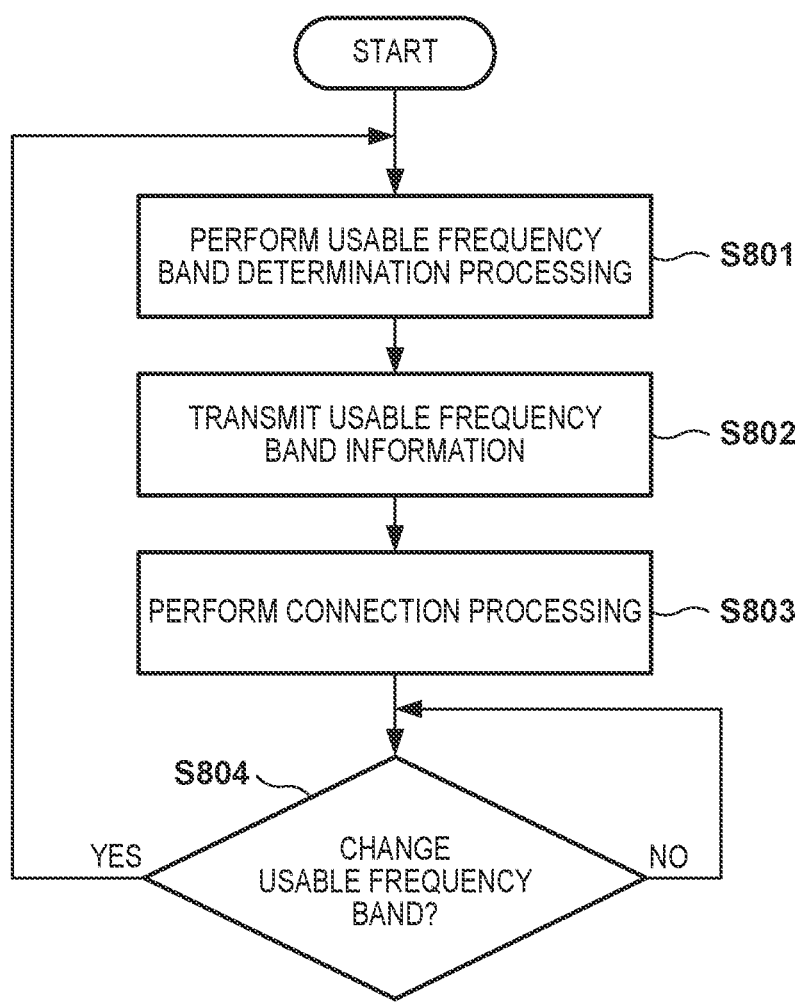

COMMUNICATION DEVICE, COMMUNICATION METHOD, AND COMPUTER-READABLE STORAGE MEDIUM

CROSS-REFERENCE TO RELATED APPLICATIONS

This application is a Continuation of International Patent Application No. PCT/JP2020/011185, filed Mar. 13, 2020, which claims the benefit of Japanese Patent Application No. 2019-068072, filed Mar. 29, 2019, both of which are hereby incorporated by reference herein in their entirety.

BACKGROUND OF THE INVENTION

Field of the Invention

The present invention relates to a communication control technique in a wireless LAN.

Background Art

In recent years. Internet usage has increased year by year together with the development of information communication technologies, and various communication techniques are being developed in response to the increase in demand. In particular, wireless local area network (wireless LAN) techniques implement throughput improvement in Internet communications for packet data, audio, video, and the like by wireless LAN terminals, and currently various technological developments are being conducted actively.

In the development of wireless LAN techniques, a lot of standardization works by the IEEE (Institute of Electrical and Electronics Engineers) 802, which is a standardization organization for wireless LAN techniques, play an important role. As one of the wireless LAN communication standards, the IEEE802.11 standards are known, including standards such as IEEE 802.11n/a/b/g/ac and IEEE 802.11ax. For example, IEEE 802.1 lax implements a high peak throughput of up to 9.6 gigabits per second (Gbps) and additionally improves the communication speed under a congested state using OFDMA (Orthogonal frequency-division multiple access) (Patent Literature 1).

Recently, in order to further improve throughput, a study group called IEEE 802.11 EHT (Extremely High Throughput) has been formed as a subsequent standard of IEEE 802.1 lax. In order to realize the throughput improvement aimed at by IEEE 802.11 EHT, a technique of performing communication by simultaneously using a plurality of frequency band channel including a 6 GHz band is being considered. In the conventional IEEE 802.11, an STA (station) which is a wireless LAN terminal is connected to an access point and performs data communication with the access point in a single frequency band. If the plurality of frequency channels including the 6 GHz band can be used simultaneously for data communication, further throughput improvement is expected.

CITATION LIST

Patent Literature

[Patent Literature 1] Japanese Patent Laid-Open No. 2018-50133

As described above, in IEEE 802.11 EHT, simultaneous communication with an access point via a plurality of frequency band channels including a 6 GHz band is considered. However, conventionally, a mechanism for notifying that an access point can use a frequency band that includes the 6 GHz band for communication has not been defined.

SUMMARY OF THE INVENTION

The present disclosure provides a mechanism for notifying that a communication device is can use frequency bands that include the 6 GHz band.

A communication device according to an aspect of the present invention has the following features. In other words, a communication device conforming to the standard of IEEE 802.11 series includes, one or more processors, and one or more memories that store a computer-readable instruction for causing, when executed by the one or more processors, the communication device to determine one or more frequency bands that the communication device can use for communication, generate a frame in which information of the determined one or more frequency bands is included, and transmit the generated frame, wherein the frame includes a Multi-band element for notifying of the information of the determined one or more frequency bands, the communication device includes the information indicating the determined one or more frequency bands in a Band ID field for identifying the frequency band in the Multi-band element, and the determined one or more frequency bands include a 6 GHz band.

Further features of the present invention will become apparent from the following description of exemplary embodiments with reference to the attached drawings.

BRIEF DESCRIPTION OF THE DRAWINGS

FIG. 6 is a view illustrating an example of a Multi-band element format.

FIG. 7 is a view illustrating an example of a Band ID field.

FIG. 8 is a flowchart illustrating processing executed by an AP in a second embodiment.

DESCRIPTION OF THE EMBODIMENTS

Figure 1:
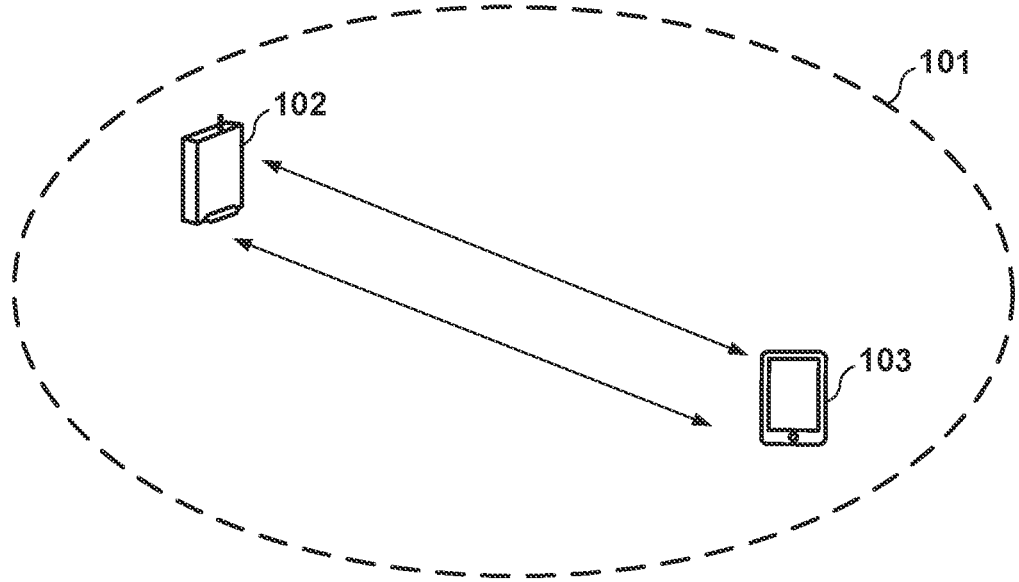
FIG. 1 is a view illustrating an example of a network configuration.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

(Network Configuration)

FIG. 1 illustrates an example of a configuration of a wireless communication network in the present embodiment. The wireless communication network is configured to include an access point (AP 102) and an STA (STA 103) as a device (EHT device) conforming to the IEEE 802.11 EHT (Extremely High Throughput) standard. Note that EHT may be understood as an abbreviation of Extreme High Throughput. As illustrated in FIG. 1, a network that the AP 102 forms is indicated by a circle 101. The STA 103 can transmit/receive signals that the AP 102 transmits/receives.

In the present embodiment, it is assumed that the AP 102 and the STA 103 can simultaneously transmit/receive frames using a plurality of radio frequency bands, as will be described later. Note that the configuration of the wireless communication network illustrated in FIG. 1 is merely an example for the sake of descriptive convenience, and, for example, a network including a large number of EHT devices and legacy devices (communication devices conforming to the IEEE 802.11a/b/g/n/ax standard) may be configured in a wider area. Further, limitation is not made to the arrangement of each communication device illustrated in FIG. 1, and the following discussion can also be applied to the positional relationship of various communication devices.

(Configuration of AP)

Figure 2:
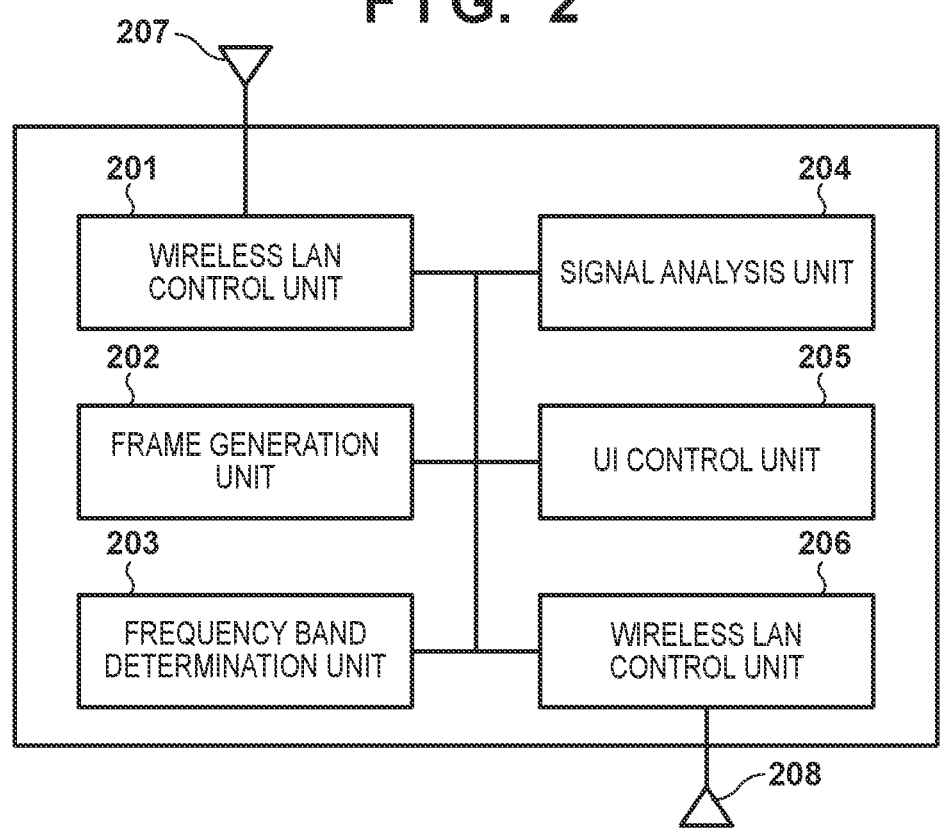
FIG. 2 is a view illustrating an example of a functional configuration of an AP.

FIG. 2 is a block diagram illustrating a functional configuration of the AP 102. The AP 102 includes, as an example of the functional configuration thereof, wireless LAN control units 201 and 206, a frame generation unit 202, a frequency band determination unit 203, a signal analysis unit 204, and a user interface (UI) control unit 205.

The wireless LAN control unit 201 may be configured to include one or more antennas 207 for transmitting/receiving radio signals (radio frames) to and from other wireless LAN devices, and a circuit, and programs for controlling these. Similarly, the wireless LAN control unit 206 may be configured to include one or more antennas 208 for transmitting/receiving radio signals (radio frames) to and from other wireless LAN devices, and a circuit, and programs for controlling these. The wireless LAN control units 201 and 206 execute communication control of the wireless LAN based on frames generated by the frame generation unit 202 according to the standard of IEEE 802.11 series. In the present embodiment, the wireless LAN control units 201 and 206 are each configured to operate in a different frequency band among a plurality of frequency bands that the AP 102 can support. Note that although FIG. 2 illustrates two wireless LAN control units, the AP 102 may have three or more wireless LAN control units each configured to operate in a different frequency band. As for which frequency band (operation frequency band) the wireless LAN control unit 201 and the wireless LAN control unit 206 operates (to which frequency band they correspond), it may be determined by a communication unit 306 (FIG. 3), the antennas 207 and 208. These operation frequency bands can also be determined by the frequency band determination unit 203. Further, as for these operation frequency bands, limitations may be placed by settings stored in a storage unit 301 (FIG. 3), and a further change may be made by user settings (operations) via an input unit 304.

Also, one or both of the wireless LAN control unit 201 and the wireless LAN control unit 206 may operate to communicate using a plurality of frequency channels (hereinafter, simply referred to as channels) in one (same) frequency band. In addition, the wireless LAN control unit 201 and the wireless LAN control unit 206 may operate to communicate in one (same) frequency band. For example, when the AP 102 operates using a plurality of channels in one (same) frequency band due to settings or the like, the wireless LAN control unit 201 and the wireless LAN control unit 206 may operate to communicate in different channels. Incidentally, when communication that uses a 6 GHz band is not performed due to such settings, configuration may be taken so as not to include information indicating the frequency band of the 6 GHz band in a Band ID field to be described later. For example, when the AP 102 operates using one channel in one (same) frequency band due to settings or the like, power supply to either one of the wireless LAN control unit 201 and the wireless LAN control unit 206 may be stopped. As a result, a power saving effect can be obtained. Note that even in such a case, both the wireless LAN control unit 201 and the wireless LAN control unit 206 may be operated. In this case, a diversity effect due to reception of signals via a plurality of antennas can be expected.

The frame generation unit 202, based on the result of the analysis performed by the signal analysis unit 204 for the signals received by the wireless LAN control unit 201 and 206, generates a frame to be transmitted in a channel in the frequency band determined by the frequency band determination unit 203.

The frame generation unit 202 may generate a frame independently of the information of the frequency band determined the frequency band determination unit 203 or the result of the analysis by the signal analysis unit 204. The generated frames may include a management frame (Beacon frame, Probe Request frame, Probe Response frame, Association Request frame, Association Response frame, Reassociation Request frame, Reassociation Response frame) conforming to the standard of IEEE 802.11 series.

The frequency band determination unit 203, among the plurality of frequency bands, determines a frequency band that can be used (operation frequency band) in the wireless LAN control unit 201 and 206. For example, the frequency band determination unit 203 may analyze the congestion level of the radio environment around the AP 102 from the signals received by the wireless LAN control unit 201 and/or the wireless LAN control unit 208, and determine a usable frequency band based on the result of the analysis. When two usable frequency bands are determined, the frequency band determination unit 203 may transmit the determined frequency bands to the communication unit 306 (FIG. 3) and/or the wireless LAN control unit 201 and the wireless LAN control unit 206 so that the wireless LAN control unit 201 and the wireless LAN control unit 206 each operate in a different determined frequency band. Also, the frequency band determination unit 203 may determine that a plurality of channels can be used in one (same) frequency band. Further, the frequency band determination unit 203 may determine to change the usable frequency bands when the degree of congestion of the radio environment around the AP 102 is changed or by a user operation and determine usable frequency bands again.

The signal analysis unit 204 performs analysis on the signals received by the wireless LAN control unit 201. The UI control unit 205 accepts operations on the input unit 304 (FIG. 3) by a user (not illustrated) of the AP 102, and performs control for transmitting the control signals corresponding to the operations to the respective components and control for outputs (including displaying or the like) to an output unit 305 (FIG. 3).

Figure 3:
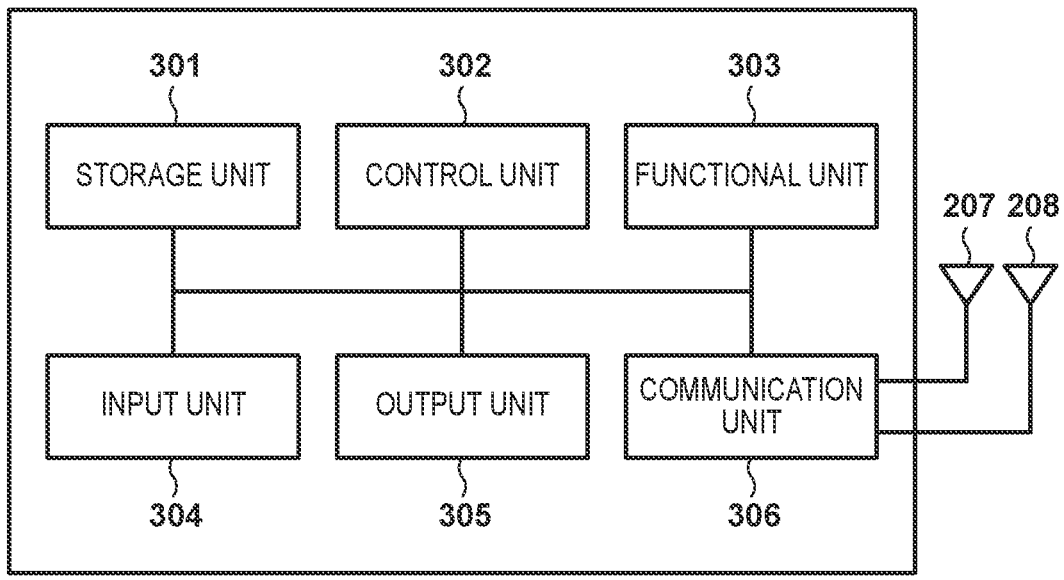
FIG. 3 is a view illustrating an example of a hardware configuration of the AP.

FIG. 3 illustrates a hardware configuration of the AP 102 in the present embodiment. The AP 102 includes, as an example of the hardware configuration thereof, the storage unit 301, a control unit 302, a functional unit 303, the input unit 304, the output unit 305, the communication unit 306, and the antennas 207 and 208.

The storage unit 301 is configured by both or either one of a ROM and a RAM, and stores programs for performing various operations to be described later and various kinds of information such as communication parameters for wireless communication. Note that in addition to a memory such as a ROM and a RAM, a storage medium such as a flexible disk, a hard disk, an optical disk, a magneto-optical disk, a CD-ROM, a CD-R, a magnetic tape, a non-volatile memory card, or a DVD may be used as the storage unit 301.

The control unit 302 is configured by, for example, processors such as a CPU and an MPU, an ASIC (Application Specific Integrated Circuit), a DSP (Digital Signal Processor), an FPGA (Field Programmable Gate Array), and the like. Here, CPU is an acronym for Central Processing Unit and MPU is an acronym for Micro Processing Unit. The control unit 302 controls the entire AP/STA by executing a program stored in the storage unit 301. Note that the control unit 302 may control the entire AP 102 in cooperation with programs and an OS (Operating System) stored in the storage unit 301.

Further, the control unit 302 controls the functional unit 303 and executes predetermined processing such as image capturing, printing, and projection. The functional unit 303 is hardware for the AP 102 to perform the predetermined processing. For example, when the AP 102 is a camera, the functional unit 303 is an image capturing unit and performs image capturing processing. Also, for example, when the AP 102 is a printer, the functional unit 303 is a printing unit and performs printing processing. Also, for example, when the AP 102 is a projector, the functional unit 303 is a projection unit and performs projection processing. The data processed by the functional unit 303 may be data stored in the storage unit 301 or data that is communicated with the STA 103 or another AP or STA via the communication unit 306 to be described later.

The input unit 304 accepts various operations from the user. The output unit 305 performs various outputs to the user. Here, the outputs by the output unit 305 include at least one of a display on the screen, an audio output by the speaker, a vibration output, and the like. Incidentally, both the input unit 304 and the output unit 305 may be realized by one module as in the case of a touch panel.

The communication unit 306 controls wireless communication conforming to the standard of IEEE 802.11 series and controls IP (Internet Protocol) communication. The communication unit 306 controls the antennas 207 and 208 to transmit/receive radio signals for wireless communication. The AP 102 communicates content such as image data, document data, and video data with other communication devices via the communication unit 306. The antennas 207 and 208 are each an antenna capable of receiving any of the sub-GHz band, the 2.4 GHz band, the 3.6 GHz band, the 4.9 and 5 GHz bands, the 60 GHz band, and the 6 GHz band, and the combination thereof is not limited. The antennas 207 and 208 may each be physically configured with one or more antennas in order to realize MIMO (Multi-Input and Multi-Output) transmission/reception.

(Configuration of STA)

The functional configuration and the hardware configuration of the STA 103 are configurations that are respectively the same as those of the functional configuration (FIG. 2) and the hardware configuration (FIG. 3) of the AP 102 described above. In other words, the STA 103 may be configured to include, as a functional configuration, wireless LAN control units 201 and 206, the frame generation unit 202, the frequency band determination unit 203, the signal analysis unit 204, and the UI control unit 205, and include, as a hardware configuration, the storage unit 301, the control unit 302, the functional unit 303, the input unit 304, the output unit 305, the communication unit 306, and the antennas 207 and 208.

(Processing Flow)

Next, a flow of processing executed by the AP 102 configured as described above and a sequence of processing executed by the wireless communication system illustrated in FIG. 1 will be described.

First Embodiment

Figure 4:
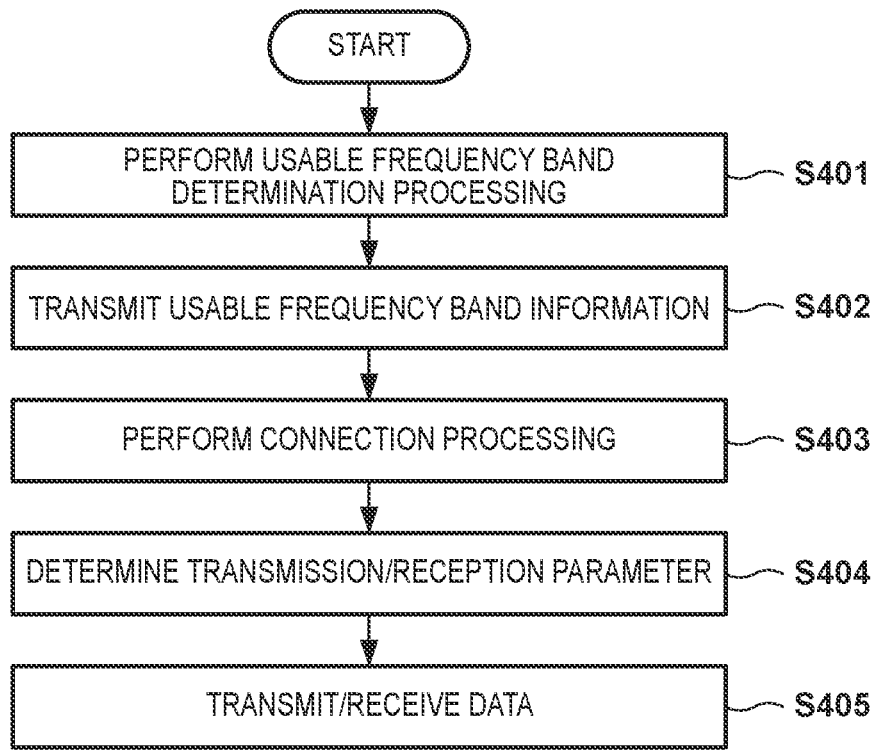
FIG. 4 is a flowchart illustrating processing executed by the AP in a first embodiment.
Figure 5:
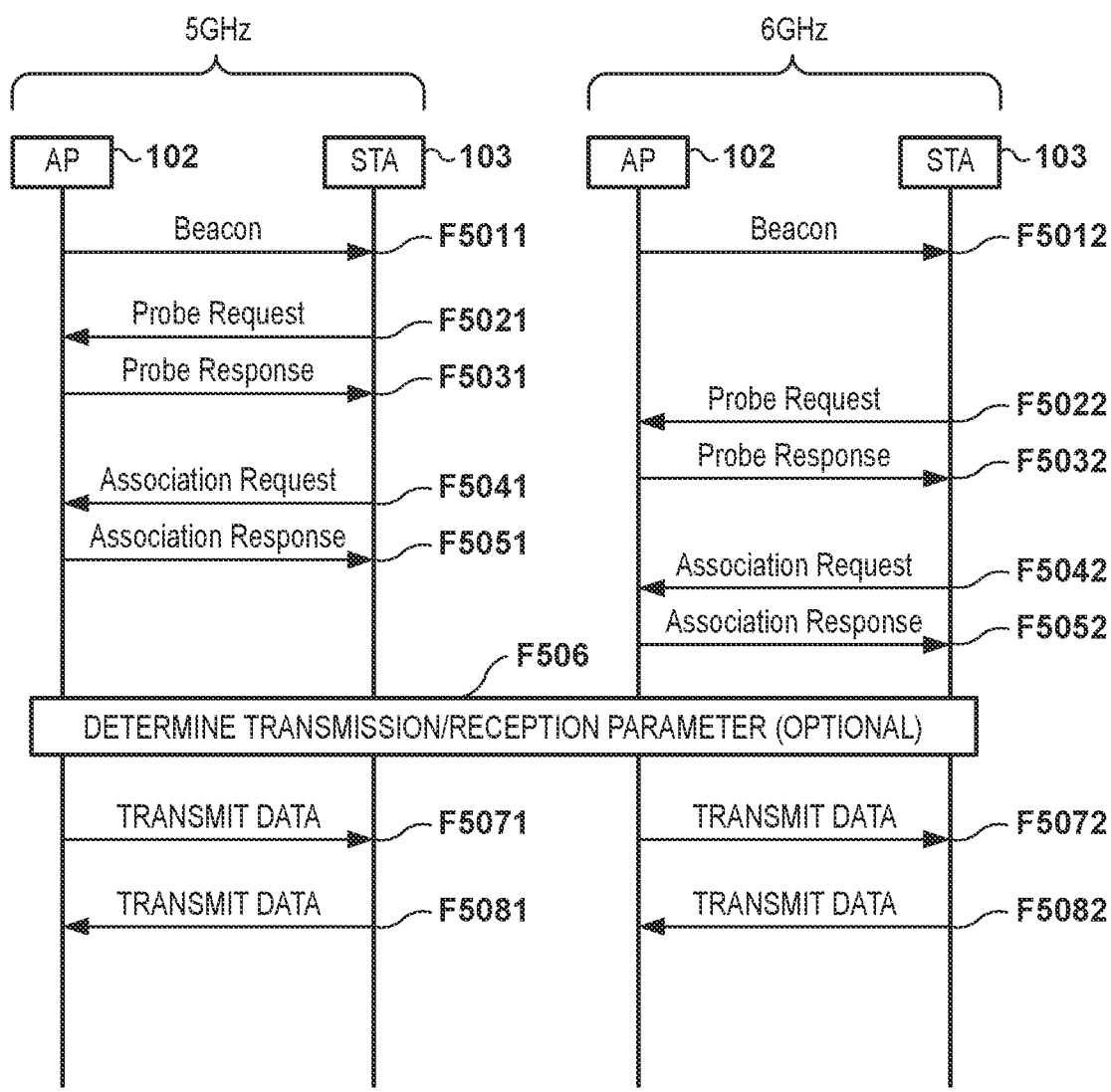
FIG. 5 is a sequence chart illustrating processing executed by a wireless communication network in the first embodiment.

FIG. 4 is a flowchart illustrating processing executed by the AP 102 in a first embodiment. The flowchart illustrated in FIG. 4 can be realized by the control unit 302 of the AP 102 executing the calculation and processing of information and the control of each piece of hardware by executing control programs stored in the storage unit 301. Also, FIG. 5 illustrates a sequence chart of processing executed by a wireless communication system in the first embodiment. The wireless LAN control unit 201 and 206 in each of the AP 102 and the STA 103 can communicate in any of the 2.4 GHz band, the 5 GHz band, and the 6 GHz band.

First, the AP 102 determines a usable frequency band among a plurality of frequency bands in which communication is possible (step S401). As described above, the AP 102 may determine a usable frequency band by analyzing the degree of congestion of the surrounding radio environment, but is not limited thereto. As a method of analyzing the congestion state, a method of transmitting Probe Request frames in candidate frequency bands (any of a plurality of frequency bands in which communication is possible) and aggregating the number of Probe Request frames for which there was a response, and a method of aggregating the number of Beacon frames received in a predetermined time period are considered. In this case, the AP 102 can determine that a frequency band in which more Probe Request frames than a predetermined threshold value are received is a congested environment and determine that it is an unusable frequency band. Instead of Probe Requests, it may be determined by the number of received Beacon frames. In addition, a method of aggregating the number of instances of carrier sensing in a predetermined time period in each candidate frequency band, a method of knowing by exchanging information with other APs, or the like are conceived, but limitation is not made to this. In the present embodiment, it is assumed that the 2.4 GHz band is in a congested state, and a case where the AP 102 determines the 5 GHz band and the 6 GHz band as usable frequency bands is envisioned.

After determining usable frequency bands, the AP 102 includes information related to usable frequency bands (usable frequency band information) in a Beacon frame and transmits it in each of the usable frequency bands at the frequency of a Beacon Interval (step S402, F5011, F5012). The Beacon Interval is typically, but not limited to, 100 milliseconds. The AP 102 may include, in the usable frequency band information, only the information other than the frequency band in which transmission is being performed. That is, the AP 102 may generate a frame including the information of one or more first frequency bands among the usable frequency bands, and transmit the frame including the information of the first frequency bands in a second frequency band different from the first frequency bands among the usable frequency bands. For example, the AP 102 may include only 6 GHz usable frequency band information in a Beacon frame transmitted at 5 GHz, and include only 5 GHz usable frequency band information for a Beacon frame transmitted at 6 GHz. Further, the AP 102, when determining that a plurality of channels in the same 5 GHz band are usable, in order to notify that different channels in the same frequency band is usable, may include usable frequency band information of the same frequency band.

The usable frequency information may be added not only to a Beacon frame but also to Probe Response, Association Response, and Reassociation Response frames transmitted by the AP 102. The STA 103 may also include its own usable frequency information in Probe Request, Association Request, and Reassociation Request frames and notify the AP 102.

FIG. 6 illustrates a Multi-band element format which is an information element for indicating usable frequency band information. For details on an Element ID field 601 to a Pairwize Cipher Suite List field 614 other than a Band ID field 604, see the IEEE 802.11 standard (e.g., IEEE Std. 802.11-2016). In the present embodiment, a Band ID value indicating the frequency band of the 6 GHz band is added to the Band ID field 604 for identifying a usable frequency band. FIG. 7 illustrates an example of the Band ID field 604. As illustrated in FIG. 7, as an example, a Band ID value=6 is defined as a numerical value indicating the 6 GHz band. Note that this numerical value may be anything, even other values such as 7 and 8, as long as the association is defined, and limitation is not made to this. The AP 102 can also store information on an operable channel by combining the information (values) included in an Operating Class field 605 and a Channel Number field 606.

In step S403, the AP 102 and the STA 103 perform processing for establishing connection. At this time, the STA 103 transmits a Probe Request frame in a frequency band that it can use and starts a scan operation (F5021, F5022). At this time, the STA 103 may initially transmit a Probe Request frame only in the 5 GHz band (F5021). The STA 103 can detect that the AP 102 also supports 6 GHz using the Band ID value included in the Probe Response frame (F5031) obtained as a response. Then, the STA 103 may transmit a Probe Request frame in the 6 GHz band for confirmation (F5022). The AP 102 operating in the 6 GHz band responds with a Probe Response frame in F5032. The AP 102 and the STA 103, after exchanging Authentication Request, Response frames (not illustrated), exchanges Association Request frames (F5041, F5042) and Response frames (F5051, F5052) and then establish a connection. When establishing a secure connection that uses encryption between the AP 102 and the STA 103, communication processing such as WPA (Wi-Fi Protected Access), WPA 2, and WPA 3 (not illustrated) may be performed after this. In the present embodiment, connection without encryption is described, but limitation is not made to this. The STA 103 may establish a connection in one or more usable frequency bands. For example, the STA 103 may establish a connection in only the 6 GHz band or, if there are three usable frequency bands, two of these may be used to establish a connection.

Once a connection with the STA 103 is established, the AP 102 may determine a transmission/reception parameter in step S404. This process is optional. The transmission/reception parameter is a parameter (information) for determining how to distribute transmission/reception data for a connection in each frequency band when connections in a plurality of frequency bands are established. For example, the AP 102 can determine the amount of distribution of data in accordance with the maximum throughput available in each frequency band, or actually send a test packet and calculate the current throughput to determine the amount of distribution. Note that the AP 102 may independently transmit/receive a separate stream in each connection without determining the transmission/reception parameter. Then, data transmission/reception is performed in step S405 in accordance with the determined transmission parameter (F5071, F5072, F5081. F5082).

As described above, according to the present embodiment, the STA 103 can know that the AP 102 can use a plurality of frequency bands including the 6 GHz band, establish an appropriate connection accordingly, and perform transmission/reception of data.

Second Embodiment

Figure 9:
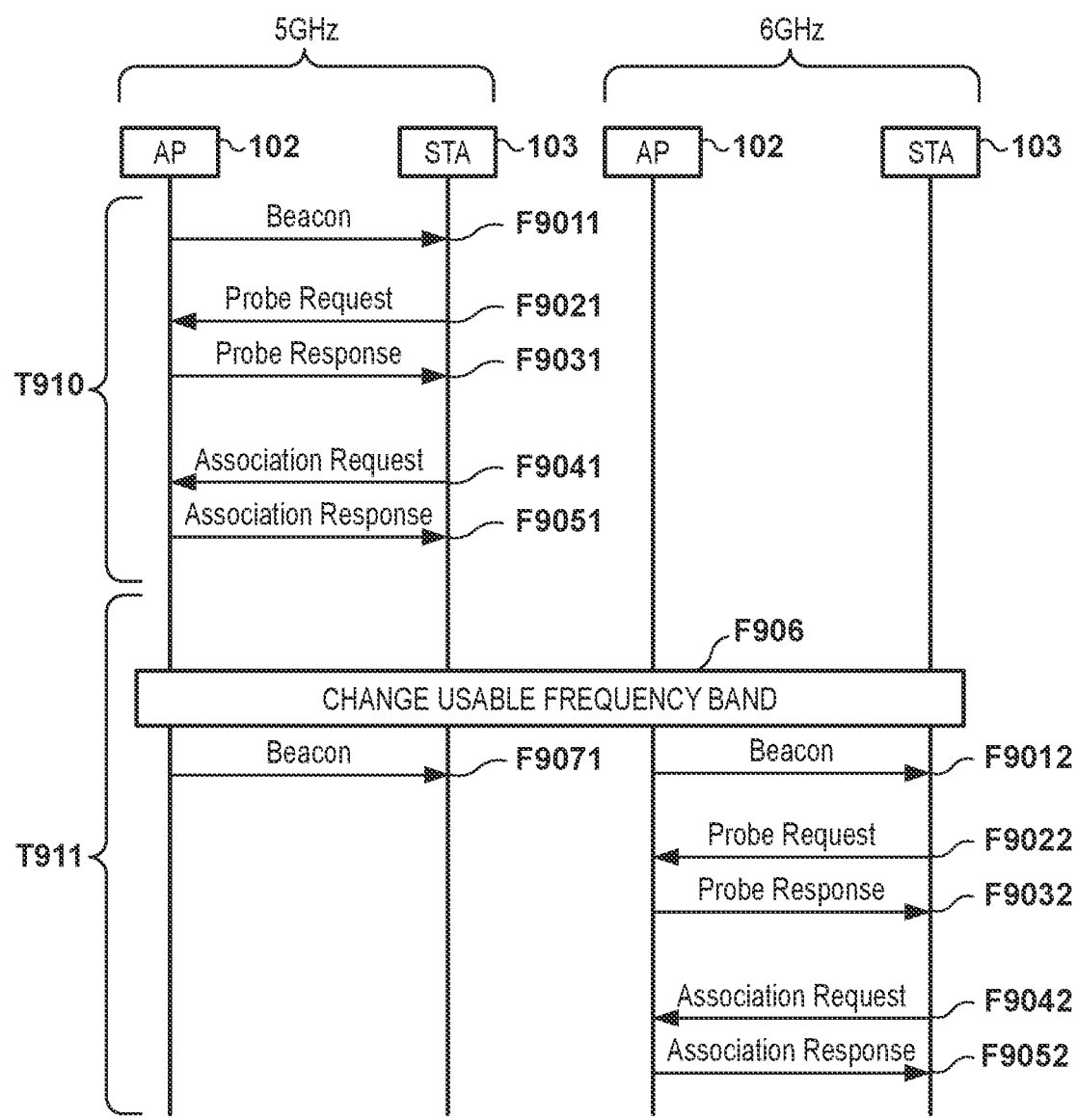
FIG. 9 is a sequence chart illustrating processing executed by a wireless communication network in the second embodiment.

FIG. 8 is a flowchart illustrating processing executed by the AP 102 in a second embodiment. The flowchart illustrated in FIG. 8 can be realized by the control unit 302 of the AP 102 executing the calculation and processing of information and the control of each piece of hardware by executing control programs stored in the storage unit 301. Also, FIG. 9 illustrates a sequence chart of processing executed by a wireless communication system in the second embodiment. The wireless LAN control unit 201 and 206 in each of the AP 102 and the STA 103 can communicate in any of the 2.4 GHz band, the 5 GHz band, and the 6 GHz band. Points of difference from the first embodiment will be described below.

First, the AP 102 determines a usable frequency band among frequency bands in which communication is possible (step S801). Similarly to the first embodiment, the AP 102 may determine the usable frequency bands in accordance with the degree of congestion of the surrounding radio environment or the like. In the present embodiment, in a time period of T910, it is assumed that the 2.4 GHz band and 6 GHz band are in a congested state, and a case where the AP 102 determines the 5 GHz band as a usable frequency band is envisioned.

After determining the 5 GHz band as the usable frequency band, the AP 102 includes usable frequency band information in a Beacon frame and transmits it in each of the usable frequency bands at the frequency of a Beacon Interval in step S802 (step S802, F9011). The Beacon Interval is typically, but not limited to, 100 milliseconds. Incidentally, since there is no usable frequency band other than the 5 GHz band between the AP 102 and the STA 103 at this time, the AP 102 may not impart usable frequency band information to Beacon frame. The AP 102 performs processing for establishing a connection with the STA 103 in step S803 (F9021 to F9051). Since the details of the processing for establishing a connection are the same as that of the processing of F5021 to F5051 of FIG. 5, the description thereof is omitted.

Once a connection with the STA 103 is established, the AP 102 determines whether or not to change the usable frequency band (step S804). For example, the AP 102 periodically performs the congestion state analysis described above, and determines whether or not to change the usable frequency band in accordance with the change in that state. Specifically, the AP 102 may determine to change the frequency band to be used when the congestion state falls below a predetermined level, but limitation is not made to this. For example, the AP 102 may determine to change the usable frequency band by an operation by the user.

If it is determined to not change the usable frequency band (No in step S804), the AP 102 confirms, again, at predetermined intervals whether or not to change the frequency band to be used. If it is determined to change the usable frequency band (Yes in step S804), the processing returns to step S801 and the AP 102 determines the usable frequency band again and determines the determined frequency as the post-change usable frequency band. For example, the AP 102, among the frequency bands that were not determined as usable among the plurality of frequency bands in which communication is possible, may determine, as a post-change usable frequency band, a frequency band that did not receive a predetermined number of Probe Request frames or a frequency band that did not receive a predetermined number of Beacon frames in a predetermined time period. Then, the AP 102 includes the usable frequency band information for the post-change available frequency band in a Beacon frame and transmits it in each of the usable frequency bands (step S802). Note that the AP 102 may update the usable frequency band information to be transmitted in step S802 only when there is an added frequency band.

In the example of FIG. 9, in the time period indicated by T911, a congestion state of the 6 GHz band is alleviated, and a case where the AP 102 determines that 6 GHz is usable is envisioned (F906). At this time, the AP 102 adds information indicating that the 6 GHz band is usable to the usable frequency band information of the Beacon frame transmitted in F9071. In addition, the AP 102 starts transmission of a Beacon frame at a frequency of a Beacon Interval also in the 6 GHz band (F9012). The STA 103 can detect that the AP 102 can use the 6 GHz band by receiving a Beacon frame in the 5 GHz band (F9071) and receiving the usable frequency band information. Then, in the processing of F9012 to F9052, the AP 102 and the STA 103 perform connection processing also in the 6 GHz band. Since the details of the connection processing are the same as that of the processing of F5012 to F5052, the description thereof is omitted.

As described above, by the AP 102 dynamically changing the usable frequency band information in accordance with the state of a usable frequency band, the AP 102 and the STA 103 can perform communication that uses the usable frequency band flexibly.

Note that although in the above-described embodiment, communication between the AP 102 and the STA 103, which are communication devices conforming to IEEE 802.11 EHT standard, is assumed, the above-described embodiment can be applied to communication of the standard of IEEE 802.11 series.

It becomes possible to notify that a communication device can use frequency bands including a 6 GHz band.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication device conforming to a standard of an Institute of Electrical and Electronics Engineers (IEEE) 802.11 series, comprising:
   one or more processors; and
   one or more memories that store a computer-readable instruction for causing, when executed by the one or more processors, the communication device to:
      determine two or more frequency bands that the communication device can use for communication;
      generate a frame in which usable frequency band information that indicates frequency bands that the communication device can use for communication is included; and
      transmit the generated frame,
      wherein the frame includes a Multi-band element for notifying the usable frequency band information, wherein the usable frequency band information indicates one or more frequency bands included in the determined two or more frequency bands, and the one or more frequency bands is obtained by omitting a frequency band used for transmission of the frame from the determined two or more frequency bands, and the usable frequency band is included in a Band ID field for identifying respective one of the one or more frequency bands in the Multi-band element, and
   wherein in a case where the frequency band used for transmission of the frame is a 6 GHz band, information indicating frequency bands other than 6 GHz band is included in the Band ID field, and in a case where the frequency band used for transmission of the frame is not a 6 GHz band, information indicating a 6 GHz frequency band is included in the Band ID field.

2. The communication device according to claim 1, wherein the communication device indicates, as the usable frequency band information, each of the frequency bands that the communication device can use for communication by a Band ID value in the Band ID field.

3. The communication device according to claim 1, wherein the frame is one of a Beacon frame, a Probe Request frame, a Probe Response frame, an Association Request frame, an Association Response frame, a Reassociation Request frame, and a Reassociation Response frame conforming to the standard.

4. The communication device according to claim 1, wherein the communication device determines the two or more frequency bands based on an operation by a user.

5. The communication device according to claim 1, wherein the communication device analyzes a congestion state of a radio environment around the communication device and determines the two or more frequency bands based on a result of the analysis.

6. The communication device according to claim 4, wherein in a case where the communication device determines to change a usable frequency band while the communication device is performing communication, the communication device determines, again, as post-change frequency bands, two or more frequency bands that the communication device can use for communication, the communication device generates a frame including information of one or more frequency bands included in the post-change frequency bands, and the communication device transmits the generated frame including the information of the post-change frequency band.

7. The communication device according to claim 1, wherein the Multi-band element includes a BSSID field indicating information related to an identifier (ID) of a Basic Service Set (BSS), and the Band ID field is arranged before the BSSID field.

8. A communication device conforming to a standard of an Institute of Electrical and Electronics Engineers (IEEE) 802.11 series, comprising:
   one or more processors; and
   one or more memories that store a computer-readable instruction for causing, when executed by the one or more processors, the communication device to receive a frame including usable frequency band information that indicates frequency bands that another communication device can use for communication,
   wherein the frame includes a Multi-band element for notifying the usable frequency band information, wherein the usable frequency band information indicates one or more frequency bands included in two or more frequency bands, and the one or more frequency bands is obtained by omitting a frequency band used for transmission of the frame from the two or more frequency bands, and the usable frequency band is included in a Band ID field for identifying respective one of the one or more frequency bands in the Multi-band element, and
   wherein in a case where the frequency band used for transmission of the frame is a 6 GHz band, information indicating frequency bands other than 6 GHz band is included in the Band ID field, and in a case where the frequency band used for transmission of the frame is not a 6 GHz band, information indicating a 6 GHz frequency band is included in the Band ID field.

9. The communication device according to claim 8, wherein the Multi-band element includes a BSSID field indicating information related to an identifier (ID) of a Basic Service Set (BSS), and the Band ID field is arranged before the BSSID field.

10. A method for controlling a communication device conforming to a standard of an Institute of Electrical and Electronics Engineers (IEEE) 802.11 series, comprising:
    determining two or more frequency bands that the communication device can use for communication;
    generating a frame in which usable frequency band information that indicates frequency bands that the communication device can use for communication is included; and
    transmitting the generated frame,
    wherein the frame includes a Multi-band element for notifying the usable frequency band information, wherein the usable frequency band information indicates one or more frequency bands included in the determined two or more frequency bands, and the one or more frequency bands is obtained by omitting a frequency band used for transmission of the frame from the determined two or more frequency bands, and the usable frequency band is included in a Band ID field for identifying respective one of the one or more frequency bands in the Multi-band element, and
    wherein in a case where the frequency band used for transmission of the frame is a 6 GHz band, information indicating frequency bands other than 6 GHz band is included in the Band ID field, and in a case where the frequency band used for transmission of the frame is not a 6 GHz band, information indicating a 6 GHz frequency band is included in the Band ID field.

11. A method for controlling a communication device conforming to a standard of an Institute of Electrical and Electronics Engineers (IEEE) 802.11 series, comprising:
    receiving a frame including usable frequency band information that indicates frequency bands that another communication device can use for communication,
    wherein the frame includes a Multi-band element for notifying the usable frequency band information, wherein the usable frequency band information indicates one or more frequency bands included in two or more frequency bands, and the one or more frequency bands is obtained by omitting a frequency band used for transmission of the frame from the two or more frequency bands, and the usable frequency band is included in a Band ID field for identifying respective one of the one or more frequency bands in the Multi-band element, and
    wherein in a case where the frequency band used for transmission of the frame is a 6 GHz band, information indicating frequency bands other than 6 GHz band is included in the Band ID field, and in a case where the frequency band used for transmission of the frame is not a 6 GHz band, information indicating a 6 GHz frequency band is included in the Band ID field.

12. A non-transitory computer readable storage medium that stores a program for causing a computer included in a communication device conforming to a standard of an Institute of Electrical and Electronics Engineers (IEEE) 802.11 series to:
    determine two or more frequency bands that the communication device can use for communication;
    generate a frame in which usable frequency band information that indicates frequency bands that the communication device can use for communication is included; and
    transmit the generated frame,
    wherein the frame includes a Multi-band element for notifying the usable frequency band information, wherein the usable frequency band information indicates one or more frequency bands included in the determined two or more frequency bands, and the one or more frequency bands is obtained by omitting a frequency band used for transmission of the frame from the determined two or more frequency bands, and the usable frequency band is included in a Band ID field for identifying respective one of the one or more frequency bands in the Multi-band element, and wherein in a case where the frequency band used for transmission of the frame is a 6 GHz band, information indicating frequency bands other than 6 GHz band is included in the Band ID field, and in a case where the frequency band used for transmission of the frame is not a 6 GHz band, information indicating a 6 GHz frequency band is included in the Band ID field.

13. A non-transitory computer readable storage medium that stores a program for causing a computer included in a communication device conforming to a standard of an Institute of Electrical and Electronics Engineers (IEEE) 802.11 series to receive a frame including usable frequency band information that indicates frequency bands that another communication device can use for communication, wherein the frame includes a Multi-band element for notifying the usable frequency band information, wherein the usable frequency band information indicates one or more frequency bands included in two or more frequency bands, and the one or more frequency bands is obtained by omitting a frequency band used for transmission of the frame from the two or more frequency bands, and the usable frequency band is included in a Band ID field for identifying respective one of the one or more frequency bands in the Multi-band element, and wherein in a case where the frequency band used for transmission of the frame is a 6 GHz band, information indicating frequency bands other than 6 GHz band is included in the Band ID field, and in a case where the frequency band used for transmission of the frame is not a 6 GHz band, information indicating a 6 GHz frequency band is included in the Band ID field.

* * * * *